United States Patent
Cohen et al.

(10) Patent No.: US 7,496,251 B2
(45) Date of Patent: Feb. 24, 2009

(54) APPARATUS AND METHODS FOR INTEGRALLY PACKAGING OPTOELECTRONIC DEVICES, IC CHIPS AND OPTICAL TRANSMISSION LINES

(75) Inventors: Guy Moshe Cohen, Mohegan Lake, NY (US); Fuad Elias Doany, Katonah, NY (US); Jeannine M. Trewhella, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/830,200

(22) Filed: Jul. 30, 2007

(65) Prior Publication Data

US 2008/0019633 A1    Jan. 24, 2008

Related U.S. Application Data

(62) Division of application No. 11/257,904, filed on Oct. 25, 2005, now Pat. No. 7,336,863, which is a division of application No. 10/669,944, filed on Sep. 24, 2003, now Pat. No. 6,985,645.

(51) Int. Cl.
    *G02B 6/12* (2006.01)
(52) U.S. Cl. ........................... 385/14; 385/129
(58) Field of Classification Search .............. 385/14, 385/129
    See application file for complete search history.

(56) References Cited

U.S. PATENT DOCUMENTS 5,343,071 A * 8/1994 Kazior et al. ............... 257/621
7,329,056 B2 * 2/2008 Sherrer et al. ................ 385/93

FOREIGN PATENT DOCUMENTS

JP          1302214        12/1989

OTHER PUBLICATIONS

English Abstract for Publication No. JP1302214.

* cited by examiner

*Primary Examiner*—Jennifer Doan
(74) *Attorney, Agent, or Firm*—F. Chau & Associates, LLC

(57) ABSTRACT

Apparatus and methods for packaging optical communication devices include optical bench structures, such as silicon-optical benches (SiOB). An optical communications apparatus includes an optical bench comprising a substrate having an electrical turning via formed therein. An optoelectronic (OE) chip and integrated circuit (IC) chip are mounted on the optical bench and electrically connected using the electrical turning via. The electrical turning via extends in directions both perpendicular and transverse to a surface of the substrate such that the OE chip and IC chip can be mounted on perpendicular surfaces of the optical bench in close proximity and electrically connected using the electrical turning via. More specifically, the OE chip and IC chip are mounted on the optical bench such that a light-emitting or light-detecting surface of the OE chip is substantially perpendicular to a surface of the IC chip having contacts, and such that optical transmission lines that are mounted parallel to the substrate surface can be directly coupled to the OE chip.

9 Claims, 10 Drawing Sheets

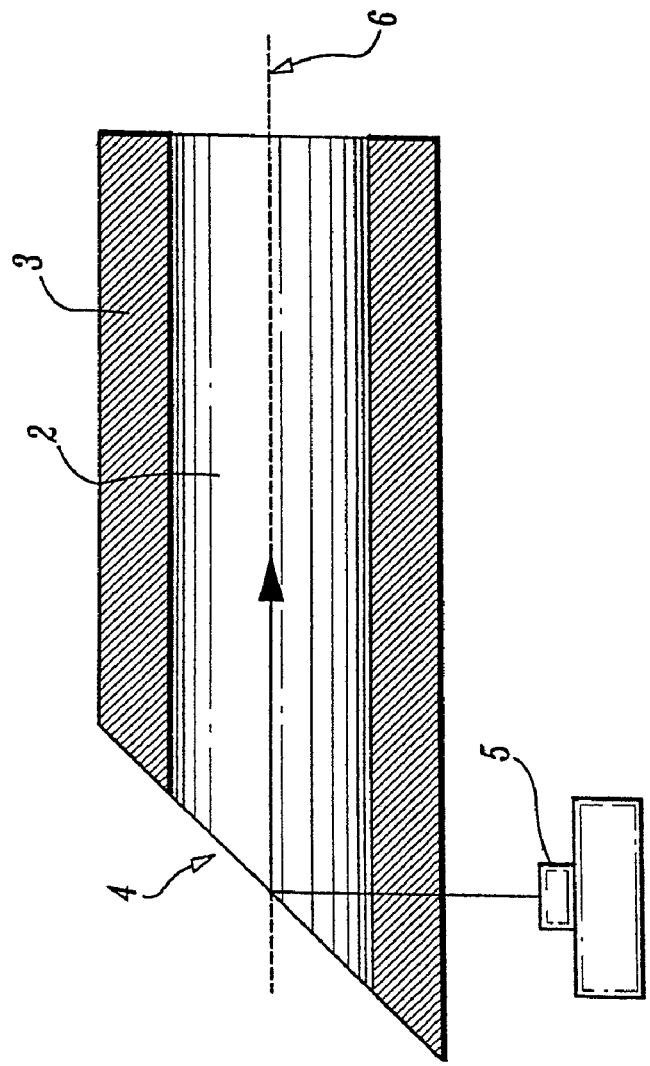
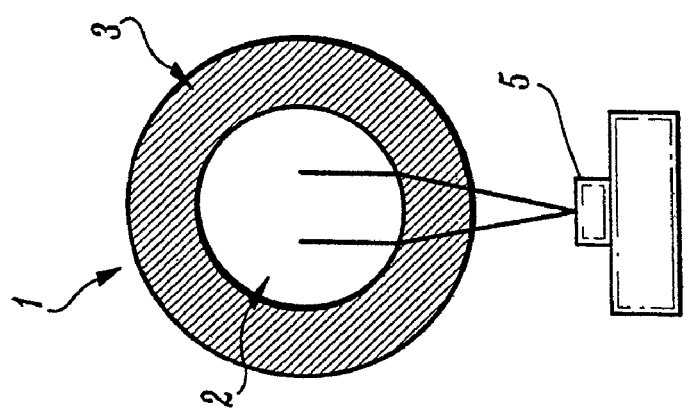
FIG. 1b
(Prior Art)
FIG. 1a
(Prior Art)

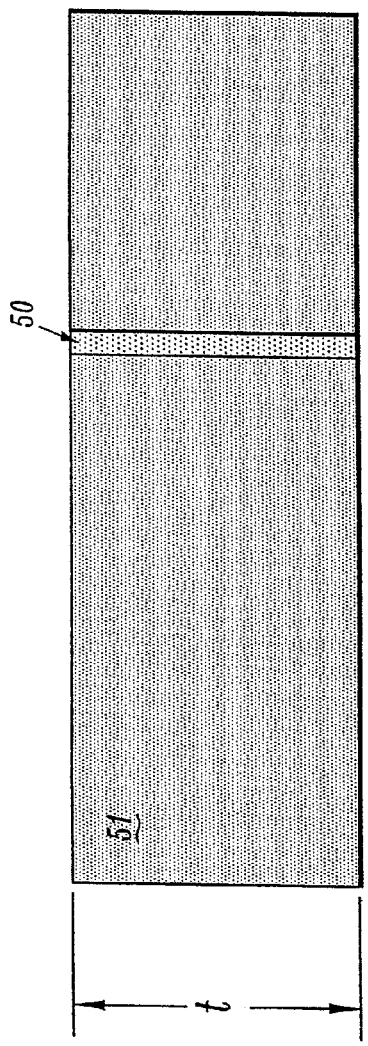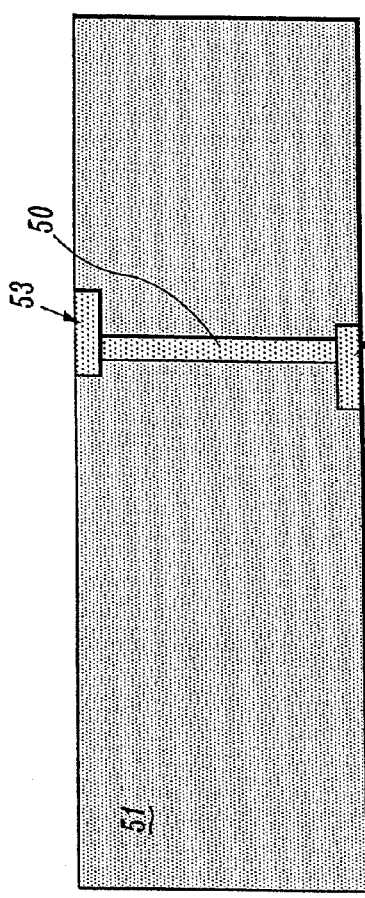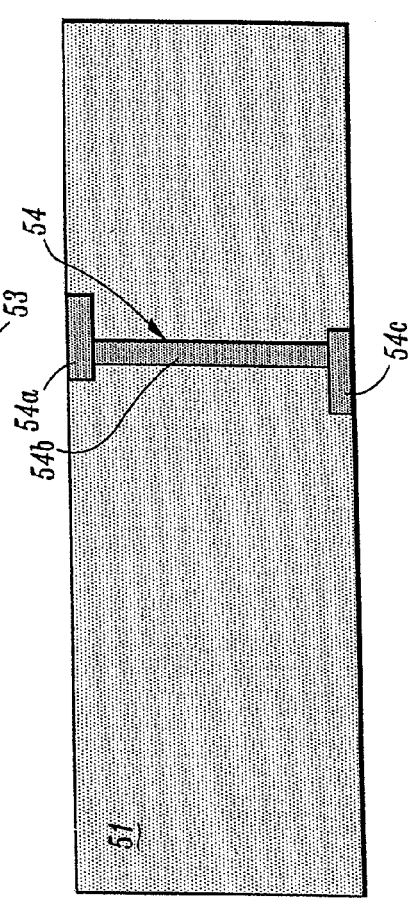

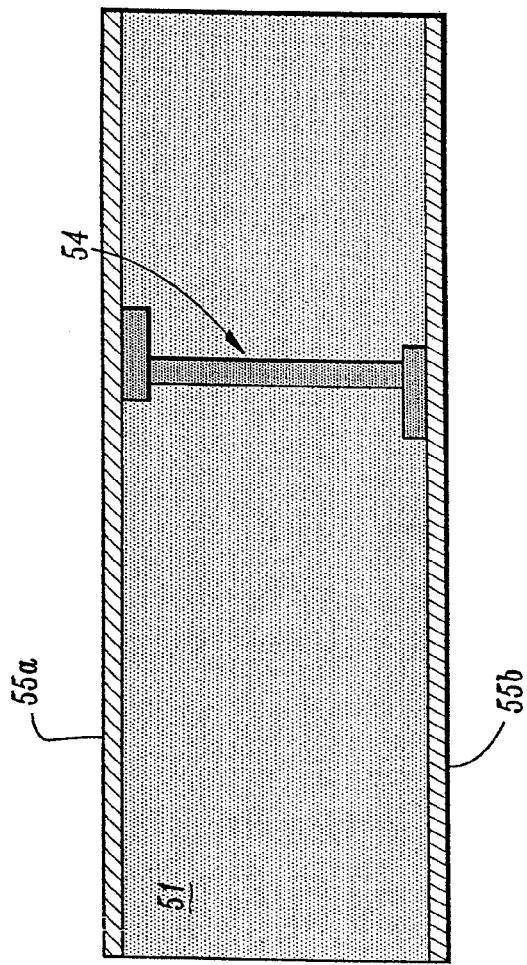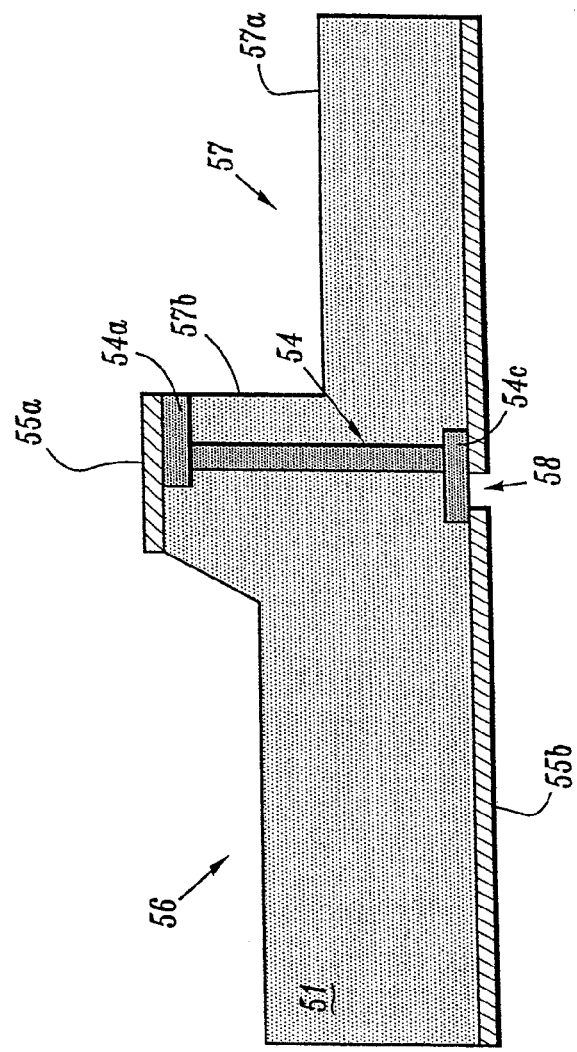

APPARATUS AND METHODS FOR INTEGRALLY PACKAGING OPTOELECTRONIC DEVICES, IC CHIPS AND OPTICAL TRANSMISSION LINES

CROSS-REFERENCE TO RELATED APPLICATION

This is a Divisional of U.S. patent application Ser. No. 11/257,904, filed on Oct. 25, 2005, now U.S. Pat. No. 7,336,863, which is a Divisional Application of U.S. patent application Ser. No. 10/669,944 filed on Sep. 24, 2003, now U.S. Pat. No. 6,985,645, which applications are fully incorporated herein by reference.

TECHNICAL FIELD OF THE INVENTION

The present invention is generally related to apparatus and methods for packaging optical communication devices. The invention more specifically relates to optical bench structures, such as silicon-optical benches (SiOB), for packaging optoelectronic (OE) chips and driving electronics and directly coupling optical transmission lines (such as optical fibers, waveguides, etc.) to OE chips using optical benches.

BACKGROUND

The development of small, efficient optical transmission lines such as optical fibers, has lead to widespread use of optical communication in many applications requiring, e.g., long distance, high data rate communication such as telecommunications. Optical fibers typically include a transparent core surrounded by a transparent cladding material having a refractive index lower than that of the core. Fiber optic transmission lines provide low cost, compact, low EMI (electromagnetic interference), and high-speed data transmission over significant distances.

In general, optical communications devices can be constructed using optical benches, or SiOB (silicon-optical bench) structures to couple optical fibers, for example, to optoelectronic components (transmitter and/or receiver) and associated driver/control integrated circuit (IC) chips. For example, an optoelectronic transmitter package comprises a transmitter (optical emitter) interfaced with a connector to optical fibers. In general, a transmitter includes a semiconductor die having light sources that emit light signals in response to electrical signals, which light signals are then transmitted through optical fibers coupled thereto.

Optoelectronic transmitter devices may employ one of a variety of light emitting diodes (LEDs) and lasers as the light sources. For instance, a vertical-cavity surface emitting laser (VCSEL) is a specialized laser diode that has been developed to provide improved efficiency and increased data speed in fiber optic communication. VCSELs are good candidates for building parallel optics communication modules since their power dissipation is low and they can be manufactured in arrays or matrix form. A VCSEL emits light in the direction that is perpendicular to the surface of the wafer.

Furthermore, an optoelectronic receiver package generally comprises a receiver (optical detector) interfaced with a connector to optical fibers. A receiver comprises a semiconductor die with light detectors (e.g., photodiodes) that receive light signals from optical fibers and convert the light signals into electrical signals. In addition, optical benches can be used for constructing optoelectronic transceiver packages comprising a transmitter and receiver interfaced with optical fibers, for example.

When designing optical communications modules and systems using OE receiver and/or transmitter chips, it is generally desirable to position optical fibers and optoelectronic chips parallel to the surface of a PCB (printed circuit board) or an optical bench. In this manner, a plurality of PCBs (having optical fibers and devices mounted thereon) can be closely spaced in parallel to each other, for example.

However, when optical fibers are disposed parallel to the surface of optoelectronic chips that emit light or detect light perpendicular to the wafer surface (and, consequently, perpendicular to the core axis of the optical fiber), there are various coupling techniques that may be employed for coupling light between the optical fibers and the light sources or light detectors.

One coupling technique is to provide a 90 degree bend in the fiber so that the end of the fiber can be effectively butted to the light source or detector. This method requires a large spacing between PCBs, for example, because of the large minimum bending radius of the optical fibers, and results in increased light loss, which may not be acceptable for various applications.

Another method is to use flex connections. For instance, a VCSEL bar can be bonded to a flexible electrical connector (flex) that is bent by 90 degrees so that the light can be coupled to the fibers. A flex connector may be comprised of metal conductors embedded in a polyimide film. Due to the mechanical properties of the flex material, a bending radius of at least one centimeter is required to obtain a 90 degree bend, which makes the wires on the flex too long to accommodate high speed signals. Moreover, the coupling of the VCSEL to the fiber requires additional optic (such as lenses) since the fiber cannot be brought close enough to the VCSEL.

Other coupling techniques include "side-coupling" methods wherein an end portion of optical fiber is disposed adjacent to the light source/detector, and wherein light emitted from a light source perpendicular to the axis of the core is coupled into the optical fiber using a mirror structure disposed near the end of the fiber, or wherein light emitted from the fiber perpendicular to the light receiving surface of a detector is coupled to the detector using a mirror. In other embodiments, an angular facet can be formed on the end of the fiber, which acts as a reflective surface (either with a reflective material formed therein or by TIR (total internal reflection) to couple light between the angular fiber end OE device aligned thereto.

For example, FIGS. 1a and 1b illustrate a conventional side-coupling method for coupling light to and from an optical fiber from the side thereof by providing an acute angular cut along the end of the optical fiber. As shown in FIGS. 1a and 1b, an optical fiber (1), which comprises a fiber core (2) surrounded by a transparent cladding material (3), comprises a reflective acute angular facet (4) formed on an end thereof, which serves as a mirror for side-coupling light to/from an optoelectronic device (5) (e.g., a top or bottom surface emitter light source, detector). The optical fiber (1) is brought in parallel to the surface of an optoelectronic device (5) (or parallel to a module, chip, optical bench surface, etc., comprising the device (5)), the surface being substantially parallel to fiber axis (6), such that the optoelectronic device (5) is aligned adjacent the side of the optical fiber (1) opposite an inner facing surface of the reflective facet (4). A reflective material is deposited on an outer surface of the facet (4).

With the side-coupling method depicted in FIGS. 1a and 1b, the light emitted in a plane perpendicular to the fiber central axis (6) is preferably reflected into the optical fiber core (2) substantially parallel to the fiber central axis (6). Further, the light traveling within the fiber parallel to the fiber axis (6) toward the reflective angular cut (4) is reflected out of the fiber core (2) through the cladding layer (3) to a detector. As illustrated in FIG. 1a, the curved fiber optic cladding material (3), which is disposed between the optoelectronic device (5) and the inner surface of the cut end (4) of the fiber core (2), acts as a cylindrical lens to partially collimate the light from a light source into the fiber core (2) as well as reduce the divergence of the light propagating from the fiber toward the detector (5).

The use of optical mirrors on an optical bench or reflective facets formed on the fibers can add to the time, cost and complexity of manufacturing optoelectronic packages. Furthermore, the use of additional components such as mirrors, for example, can add more factors that decrease the accuracy of alignment of the OE device and fibers to provide sufficient coupling of light and increase optical cross-talk.

As the operating speed of optical communications systems increases, lower optical coupling losses are required. Thus, it is highly desirable to develop devices and methods for packaging optoelectronic devices and optical fibers, which provide efficient and accurate alignment for directly coupling OE devices and fibers, as well as compact designs for purposes of high-speed operation and space efficiency.

SUMMARY OF THE INVENTION

Exemplary embodiments of the invention generally include apparatus and methods for packaging optical communication devices. Exemplary embodiments further include optical bench structures, such as silicon-optical benches (SiOB), for packaging optoelectronic (OE) chips and driving electronics and directly coupling optical transmission lines (such as optical fibers, waveguides, etc.) to OE chips using optical benches.

In one exemplary embodiment of the invention, an optical communications apparatus comprises an optical bench comprising a substrate having an electrical turning via formed therein. An optoelectronic (OE) chip and integrated circuit (IC) chip are mounted on the optical bench and electrically connected using the electrical turning via. The electrical turning via extends in directions both perpendicular and transverse to a surface of the substrate such that the OE chip and IC chip can be mounted on perpendicular surfaces of the optical bench in close proximity and electrically connected using the electrical turning via. More specifically, the OE chip and IC chip are mounted on the optical bench such that a light-emitting or light-detecting surface of the OE chip is substantially perpendicular to a surface of the IC chip having contacts, and such that optical transmission lines that are mounted parallel to the substrate surface can be directly coupled to the OE chip.

In another exemplary embodiment of the invention, an optical bench comprises a substrate having a first surface, a second surface and a third surface, wherein the first and second surfaces define planes that are substantially parallel, and wherein the third surface defines a plane that is substantially perpendicular to the planes defined by the first and second surfaces and a conductive via formed in the substrate. The conductive via comprises a first end portion exposed on the third surface, and a second end portion exposed on the second surface.

In another exemplary embodiment, the optical bench comprises a cavity having a sidewall defined by the third surface. The cavity sidewall and first surface define an edge which is used for push-stop alignment of an OE chip when the OE chip is mounted to the optical bench. The cavity sidewall surface is used for push-stop alignment of the OE chip, when the OE chip is mounted on the optical bench. Furthermore, the optical bench comprises alignment marks formed on a surface of the substrate near the edge.

In yet another exemplary embodiment, the optical bench comprises optical transmission lines such as optical fibers mounted in v-groove channels etched in the first surface of the substrate or a waveguide structure formed on the first surface. The optical bench can be populate with one or more OE chips and IC chips for packaging an optoelectronic transmitter, an optoelectronic receiver or an optoelectronic transceiver.

In another exemplary embodiment of the invention, a method for fabricating an optical bench comprises providing a substrate having a first surface and a second surface, the first and second surfaces defining planes that are substantially parallel, etching a via hole through the substrate between the first and second surfaces, etching a first cavity in the first surface, wherein the first cavity overlaps a first end portion of the via hole exposed on the first surface, filling the via hole and first cavity with a conductor to form a conductive via.

These and other exemplary embodiments, features, aspects, and advantages of the present invention will be described and become apparent from the following detailed description of exemplary embodiments, which is to be read in connection with the accompanying drawings.

BRIEF DESCRIPTION OF THE DRAWINGS

FIGS. 1a and 1b are diagrams illustrating a conventional method for side-coupling light between an optical fiber and optoelectronic device.

FIGS. 6A-6F are diagrams illustrating a method for fabricating an optical bench according to an exemplary embodiment of the present invention, wherein:

FIG. 6A is a cross-sectional side view schematic illustrating a silicon substrate having a through via formed therein;

FIG. 6B is a cross-sectional side view of FIG. 6A after cavities are etched in the substrate surfaces at top and bottom ends of the via;

FIG. 6C is a cross-sectional side view of FIG. 6B after the via and cavities are filled with metal;

FIG. 6D is a cross-sectional side view of FIG. 6C after insulation layers are deposited on upper and lower surfaces of the substrate;

FIG. 6E is a cross-sectional side view of FIG. 6D after etching a cavity for hosting an OE device and etching v-groove channels for mounting optical fibers; and FIG. 6F is a cross-sectional view of FIG. 6E following plating of solder bumps on exposed portions of the metal filled cavities.

DETAILED DESCRIPTION OF EXEMPLARY EMBODIMENTS

Exemplary embodiments of the invention including apparatus and methods for packaging optical communication devices and, in particular, optical bench structures, such as silicon-optical benches (SiOB), for packaging optoelectronic (OE) chips and driving electronics and directly coupling optical transmission lines (such as optical fibers, waveguides, etc.) to OE chips using optical benches, will now be described in detail with reference to FIGS. 2-9, wherein the same reference numbers denote like or similar structures.

Figure 2:
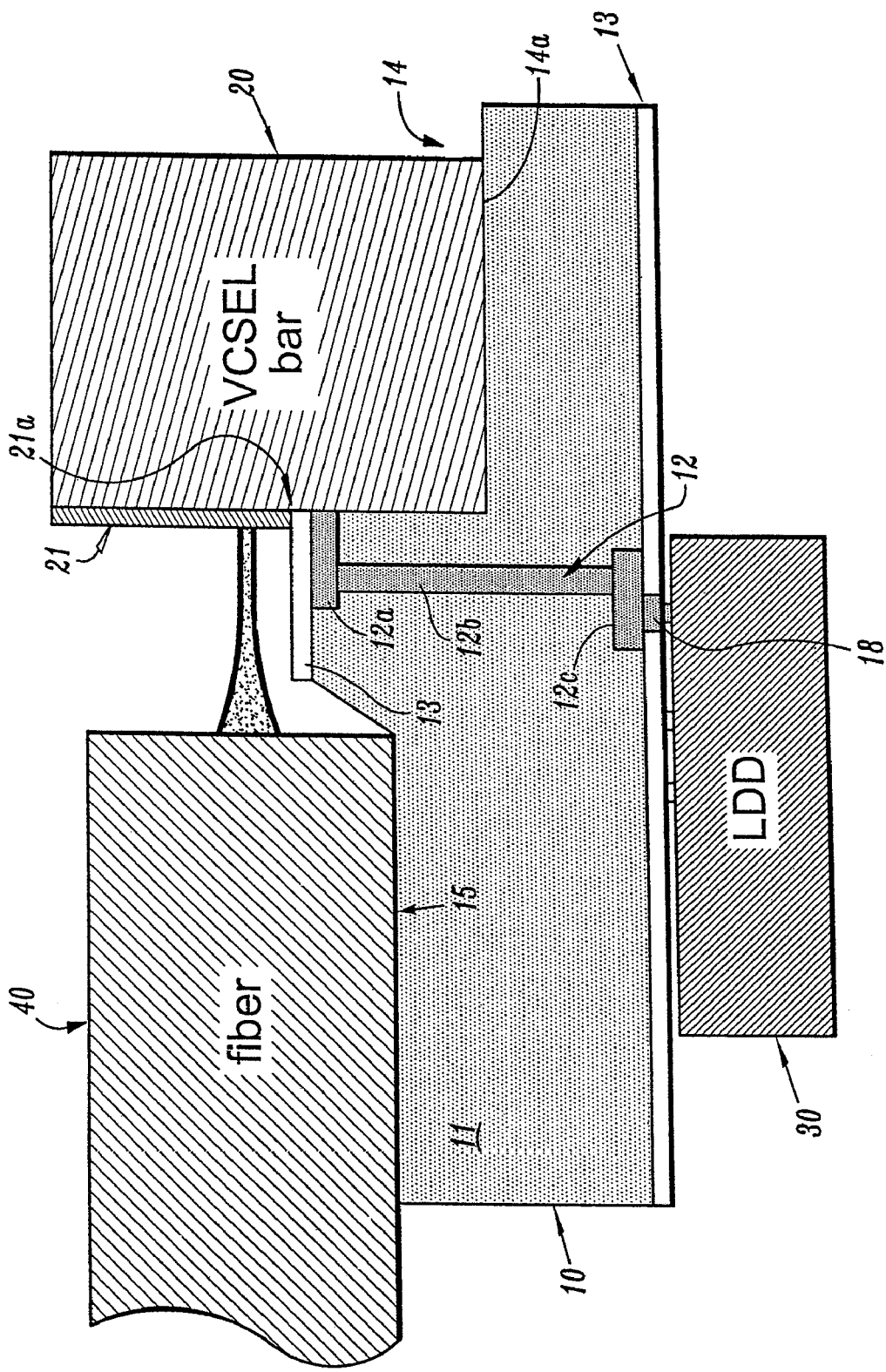
FIG. 2 is a schematic diagram of an optical apparatus illustrating a populated optical bench having one or more optical transmission lines, optoelectronic devices and support ICs attached to the optical bench, according to an exemplary embodiment of the invention.

FIG. 2 is a schematic diagram of an optical apparatus according to an exemplary embodiment of the present invention. In general, the optical apparatus comprises an optical bench (10) for packaging a plurality of optical components comprising an optoelectronic device, such as a VCSEL bar (20), one or more control/support IC chips, such as a LLD (laser diode driver) IC chip (30) for driving the VCSEL (20), and one or more optical transmission lines such as optical fibers (40) for transmitting optical data in the form of light signals, e.g., received from the VCSEL bar (20). In the exemplary embodiment of FIG. 2, the VCSEL (20) comprises a film layer (21) having a ledge portion (21a) formed on light-emitting surface thereof, which as explained below, provides a mechanism for push-stop passive alignment when the VCSEL (20) is mounted on the optical bench (10).

An optical bench structure according to the invention, such as the exemplary optical bench (10) in FIG. 1, enables direct coupling of an OE chip such as the VCSEL bar (20) to optical transmission lines such as the optical fibers (40), thereby eliminating the need for conventional flex connections or reflective mirrors for side-coupling. Additionally, the exemplary optical bench (10) structure enables the VCSEL (20) to be disposed closer to the LDD IC chip (30) than would be possible in a conventional configuration where the VCSEL chip (20) and the LDD (30) are flipped and bonded next to each other. Furthermore, the exemplary optical bench (10) comprises alignment mechanisms that enable precise alignment (passive and active) of the optical fibers (40) to the VCSEL (20), for example.

An exemplary embodiment of the optical bench (10) as depicted in FIG. 2 will now be discussed in detail with additional reference to FIG. 3, which is a three-dimensional perspective view schematically illustrating the optical bench (10), and FIG. 5, which is a three-dimensional perspective view schematically illustrating the populated optical bench (10) of FIG. 2. In one exemplary embodiment, the optical bench (10) is a SiOB (silicon-optical bench) comprising a silicon substrate (11) that is subjected to a plurality of semiconductor fabrication processes to form one or more electrical turning vias (12) within the substrate (11), insulation layers (13) on top and bottom surfaces of the substrate (11), a cavity (14) for hosting an OE device (such as the VCSEL bar (20)), one or more v-groove channels (15) etched in the substrate (11) for mounting the fibers (40), and one or more plated solder bumps (18) formed in etched openings of the insulating layer (13) for connecting turning vias (12) to the LDD (30). Furthermore, plated solder bumps are formed on exposed portions of the vias (12) on a vertical sidewall (14b) of the optical bench (10) for connecting the turning vias (12) to the VCSEL bar (20). A method according to an exemplary embodiment for fabricating the optical bench (10) will be discussed below with reference to FIGS. 6A-6F, for example.

The optical bench (10) comprises one or more conductive turning vias (12) that provide electrical connection between the LDD IC (30) mounted on a bottom surface of the optical bench (10) and the VCSEL bar (20) mounted in the etched cavity (14) of the substrate (11). The turning vias (12) comprise a vertical portion (12b), which extends vertically from a bottom to a top surface of the silicon substrate (11) (i.e., along a z-axis perpendicular to the plane of the top and bottom surfaces of the substrate (11)), as well as horizontal portions (12a) and (12c) (or "bending contacts") that bend about 90 degrees from the vertical portion (12a) and extend in a transverse direction substantially parallel to the planes defined by top and bottom surfaces of the substrate (11). In other words, the bending contacts (12a) and (12c) are essentially lateral extensions of the vertical via portion (12b).

Figure 3:
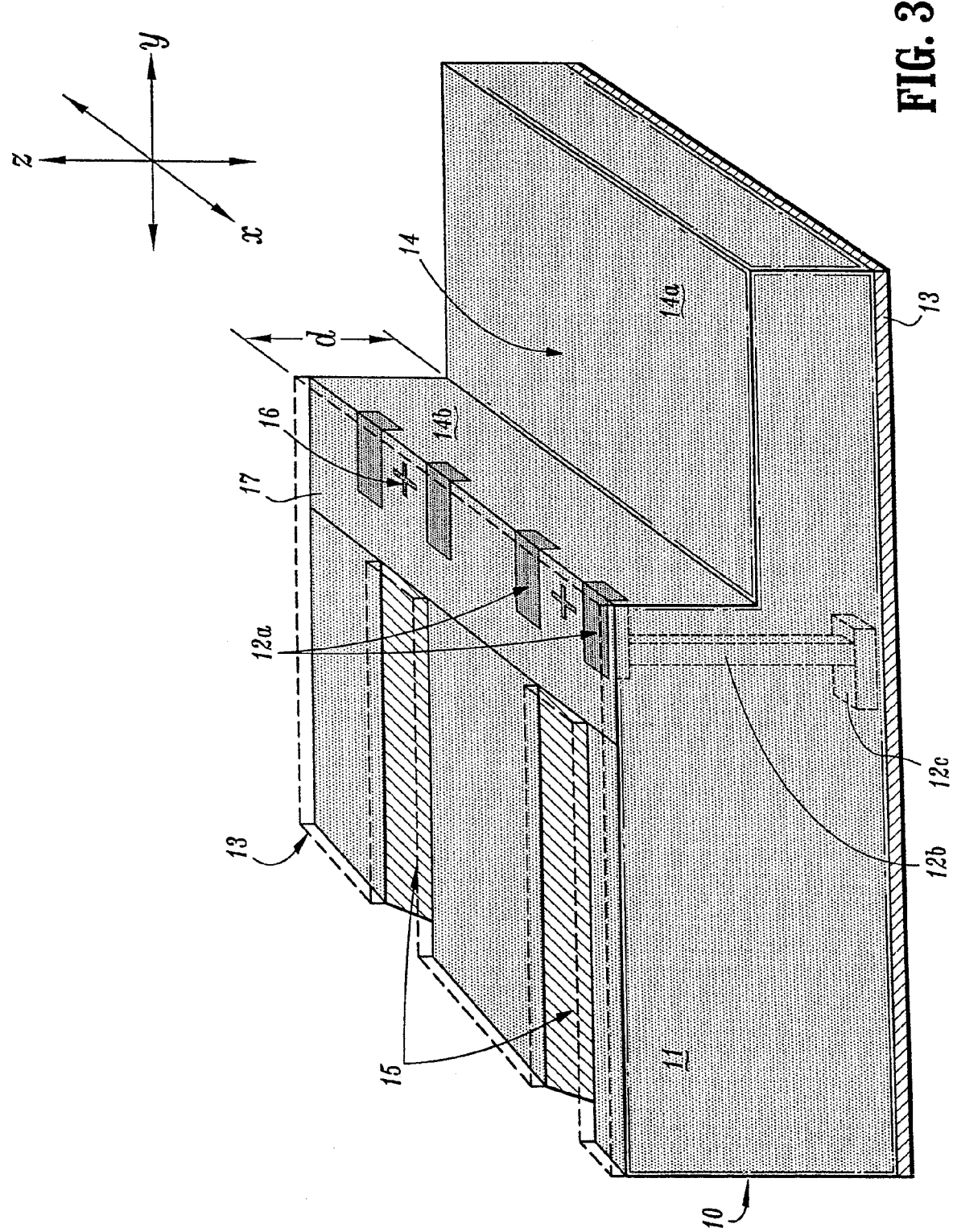
FIG. 3 is a three-dimensional perspective view schematically illustrating an optical bench according to an exemplary embodiment of the invention.
Figure 4A:
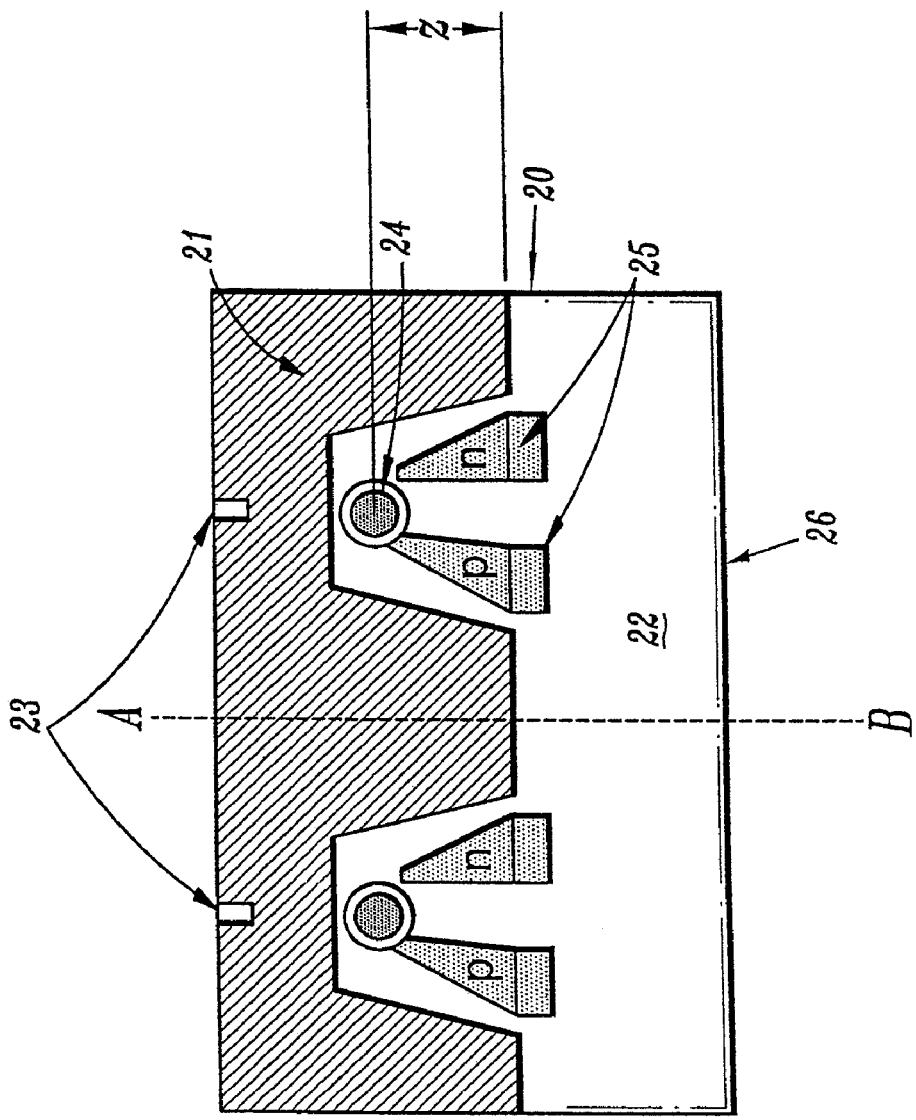
FIG. 4A schematically illustrates a top view of a optoelectronic device having an alignment structure that enables passive alignment of the optoelectronic device to an optical bench, according to an exemplary embodiment of the present invention.

In one exemplary embodiment, as shown in FIG. 3, a side portion of the upper bending contacts (12a) of one or more turning vias (12) are exposed on a vertical sidewall (14b) of the substrate (10) that defines the etched cavity (14). The exposed portions of the upper bending contacts (12a) having solder bumps plated thereon for making electrical connections between the VCSEL bar (20) and turning vias (12). For example, for purposes of illustration, the exemplary embodiment of FIG. 3 depicts two pairs of turning vias (12) having upper bending contacts (12a) exposed on the vertical sidewall (14b). FIG. 4A schematically illustrates a top (light emitting) surface (22) of the VCSEL bar (20) having two VCSELs (24) (laser diodes) and corresponding pairs of P/N contact pads (25). The VCSEL bar (20) in FIG. 4A can be mounted in the cavity (14) of the optical bench (10) and then aligned (using mechanisms as described herein) such that each pair of P/N contact pads (25) of the VCSELs (24) can be connected to the portions of a corresponding pair of upper bending contacts (12a) exposed on the sidewall (14b).

Furthermore, as depicted in FIG. 2, the lower bending contacts (12c) of the turning vias (12) have solder bumps (18) formed thereon for making electrical connection to contact pads of the LDD IC chip (30). In one exemplary embodiment, the bending contacts (12a) and 12(c) are formed as short as possible such that the length of a turning via (12) is about the same as the thickness of the substrate (11), e.g., about 500 microns. Such short leads provide very good high-speed electrical characteristics for transmitting driving signals from the LDD (30) to the VCSEL bar (20).

It is to be understood that the turning vias (12) depicted in FIGS. 2 and 3, for example, are merely illustrative of one exemplary embodiment, and that various types of turning vias can be formed depending on the application and design. For instance, some turning vias (12) may be formed having no bottom bending contact (12c) in instances, for example, where no routing is needed and the bottom of the vertical portion (12b) can be connected directly to a chip pad. The bottom bending contacts (12c) allow the LDD (30) to be mounted such that it is offset from the VCSEL bar (20) (i.e., not directly under the cavity (14)), which is desirable to prevent the VCSEL bar (20) from being affected by heat dissipation from the LDD IC chip (30). In any event, it is preferable to keep the LDD (30) and VCSEL bar (20) as close as possible to minimize the length of the turning vias (12) which connect such components.

Furthermore, turning vias (12) may include vias for transmitting data signals from the LDD (30) for driving the light emitting VCSELs (24) of the VCSEL bar (20) or providing power and/or ground connections. Furthermore, in another exemplary embodiment, shielding vias (or ground vias) can be formed in the substrate (11) between each pair of turning vias that feed P/N contacts of a VCSEL, to thereby electrically shield each VCSEL from its neighbors and reduce the electrical cross-talk between channels.

Referring again to FIGS. 2, 3 and 5, for example, the cavity (14) is formed in the substrate (11) for hosting the VCSEL bar (20) (or another type of OE device). The cavity (14) is defined by a bottom surface (14a) and a vertical side surface (14b). The cavity (14) is etched to a desired depth (d) below a top surface (17) of the substrate (11) to the bottom surface (14a) of the cavity (14). Furthermore, the array of v-grooves (15) are etched into the substrate (11) for mounting the optical fibers (40) therein.

As shown in the exemplary embodiment of FIG. 2, for example, the VCSEL bar (20) and optical fibers (40) are mounted on the optical bench (10) such that the top surface (22) (i.e., light emitting surface) of the VCSEL bar (20) faces the end portions of the optical fibers (40) (i.e., the top surface (22) of the VCSEL bar (20) is mounted substantially perpendicular to the longitudinal axis of the fiber cores). In this manner, the light that is emitted from the VCSELs (24) perpendicular to the top surface (22) of the VCSEL bar (20) is directly coupled into the cores of the fibers (40) (assuming proper alignment).

The optical bench (10) structure enables the ends of the optical fibers (40) to be positioned very close to the VCSELs (24) to allow direct optical coupling with minimal divergence of the light as it propagates from the VCSELs (24) to the fiber cores.

Various alignment mechanisms are provided in accordance with exemplary embodiments of the invention to provide accurate alignment of OE devices and optical transmission lines mounted on an optical bench in three-dimensions, referred to herein as Z-direction, Y-direction, and X-direction. As depicted in FIGS. 3 and 5, for example, the Z-direction is defined by an axis that is perpendicular to the upper and lower surfaces of the substrate (11) and extends in a vertical direction, the X-direction is defined by an axis that is parallel to the surface of the substrate (11) and extends in a direction transverse to the v-groove channels (15), for example, and the Y-direction is defined by an axis that is parallel to the surface of the substrate (11) and extends in a longitudinal direction of the v-groove channels (15).

With reference to the exemplary embodiments of 2-5, for example, the optical bench (10) comprises a plurality of surfaces that are used as stopping surfaces for providing passive (push-stop) alignment in the Z and Y-directions when the VCSEL bar (20) is placed into the cavity (14). For example, the top surface of the optical bench (10) (i.e., the top surface of the upper insulation layer (13)) meets the vertical sidewall (14b) to form an edge that extends in the X-direction. When the VCSEL bar (20) is side-mounted in the cavity (14) of the optical bench (10) (i.e., the top surface (22) of the VCSEL bar (20) is perpendicular to the plane of the upper and lower substrate surfaces), passive (push-stop) alignment of the fibers (40) to the VCSELs (24) of the VCSEL bar (20) in the Z-direction can be obtained by contacting the bottom ledge portion (21a) of the push-stop film (21) to the upper surface of the optical bench (10) along the edge.

Figure 4B:
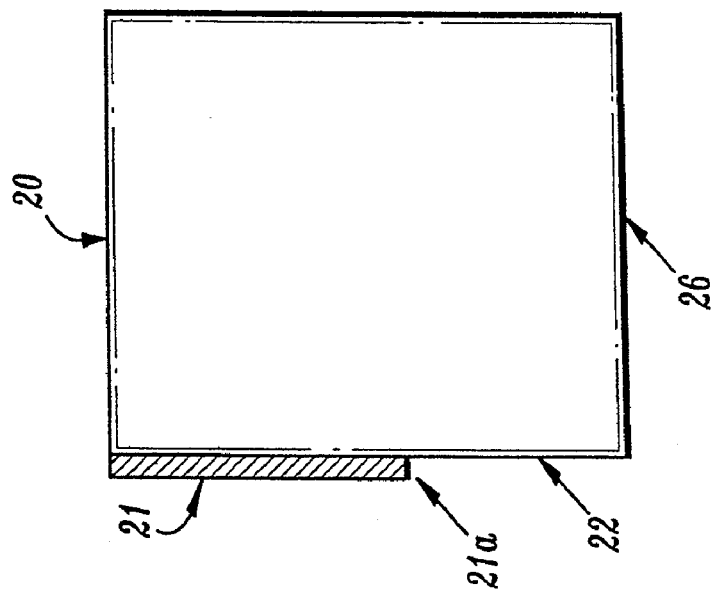
FIG. 4B schematically illustrates a cross-sectional side view of the optoelectronic device of FIG. 4A taken along line AB in FIG. 4A.

Indeed, as depicted in FIGS. 4A and 4B, for example, the distance "z" from the bottom ledge portion (21a) of the push-stop thin-film (21) to a center axis of the VCSEL (24) can be accurately defined by using photolithography methods to form the film (21) on the surface (22) of the VCSEL bar (20). Thus, when the bottom ledge portion (21a) of the push-stop film (21) rests on the upper surface of the optical bench (10) along the edge, the center of the VCSEL emitting region (24) will be a distance "z" above the top surface. Knowing this distance, and the diameter of the optical fibers to be employed, the v-groove channels can be formed having a given depth such that when mounted in the v-groove channels, the center of the fiber cores are Z-aligned to the center of the VCSELs (24), i.e., the center of the fiber cores is above the top surface by distance "z".

Furthermore, the optical bench (10) provides a mechanism for passive (push-stop) alignment along the Y-direction to place the ends of the fiber (40) at a predetermined desired distance from the VCSELs (24). In one exemplary embodiment, alignment in the Y-direction is obtained by the vertical sidewall (14b) of the cavity (14) acting as a stopping surface when the top surface (22) of the VCSEL bar (22) makes contact thereto. The distance between the ends of the fibers (40) and the VCSELs (24) will vary depending on factors such as, for example, the width of the V-grooves (which limits whether such grooves can be formed in the substrate (11) between corresponding upper bent contacts (12a) for a given channel, the thickness of the film (21) (which should be thick enough to form a ledge (21a) with sufficient structural size and integrity for enabling push-stop alignment), the thickness of the turning vias (12), etc.

Moreover, in another exemplary embodiment, alignment in the X-direction can be obtained by sliding the VCSEL bar (20) in the x-direction as it rests on the edge to actively align the alignment marks (23) formed on the VCSEL bar (20) or push-stop film (21) (FIG. 4A) to the alignment marks (16) that are etched in the surface (17) using a suitable alignment tool. In the exemplary embodiment, although an insulation layer (13) is formed over the substrate surface (17), the alignment marks (16) can still be identified for alignment. For instance, the insulation layer (13) may comprise a transparent material. If the insulation layer is not transparent, the topology of the etched alignment mark will be sufficiently transferred to the surface of the insulation layer (13) to thereby identify the mark (16). In one exemplary embodiment, the alignment marks (16) are co-etched with the v-grooves (15) to provide an accurate marker.

Figure 5:
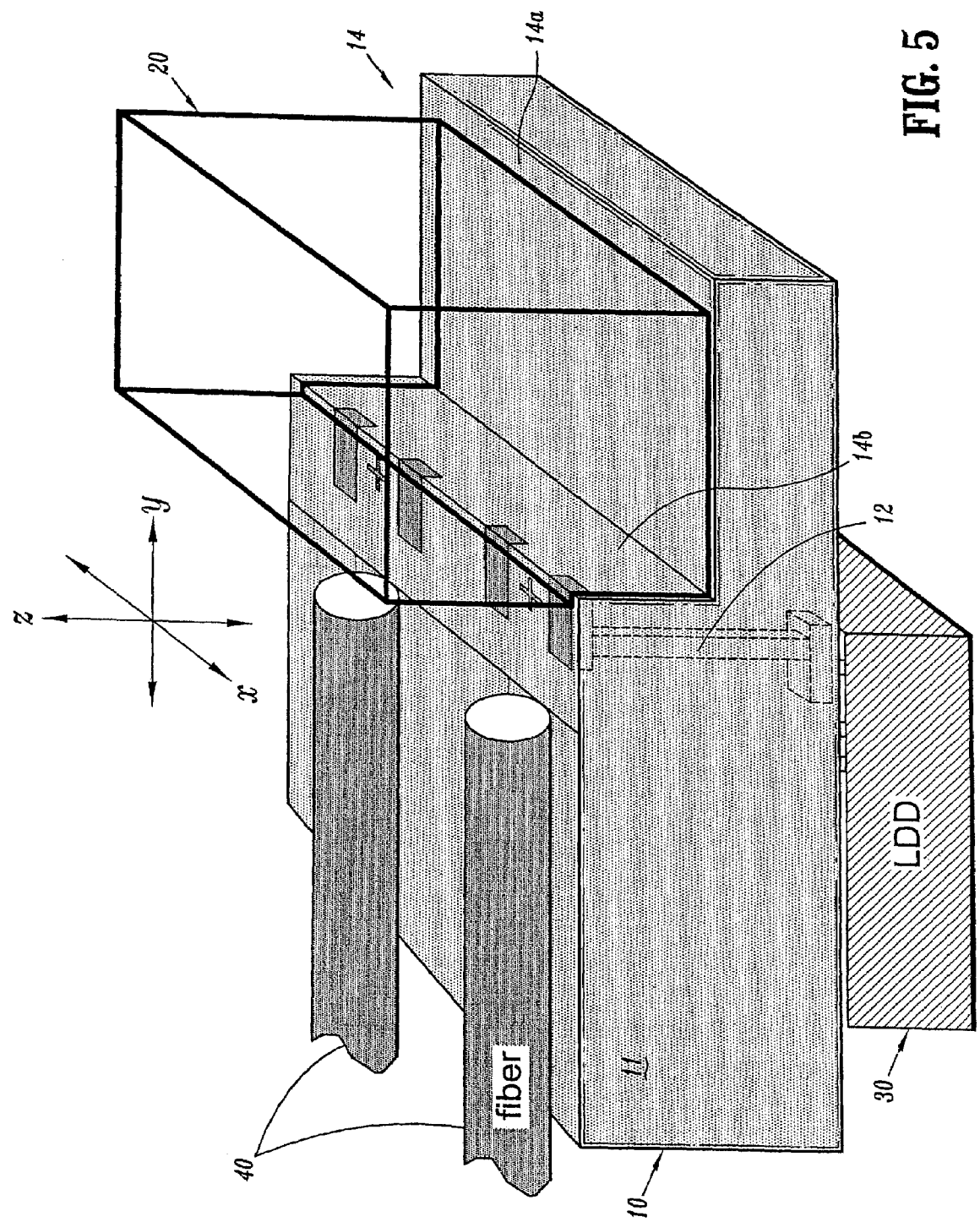
FIG. 5 is three-dimensional perspective view schematically illustrating the optical apparatus depicted in FIG. 2.

FIG. 5 is three-dimensional perspective view schematically illustrating the optical apparatus depicted in FIG. 2. FIG. 5 schematically illustrates the SiOB (10) populated with the VCSEL bar (20) that is directly coupled, and aligned, to optical fibers (40) and the laser diode driver (LDD) chip (30) mounted on the bottom of the SiOB (10) and connected to the VCSEL bar (20) via turning vias (12). The alignment of the VCSEL bar (20) to the fibers (40) can be achieved by the use of solder pulling (passive alignment) when the exposed portions of the upper bent contacts (12a) are soldered to the P/N contact pads.

Although the exemplary embodiment of FIG. 5 depicts an optoelectronic transmitter package having optical fibers mounted therein, wherein the LDD IC chip (30) generates control signals to drive the VCSEL bar (20) to generate optical data signals that are emitted from the VCSEL bar (20) and coupled into the optical fibers (40) for transmission to a receiver, it is to be understood that such embodiment is merely illustrative and that various embodiments of optical communications packages can be readily envisioned by those of ordinary skill in the art based on the teachings herein.

For example, an optical communications apparatus similar to the embodiments of FIGS. 2 and 5 can be formed with the v-groove channels, but without optical fibers mounted therein. In such embodiment, the apparatus could be connected to another device having a substrate with a matching v-groove array with fibers mounted therein.

Further, the optical bench (10) can be implemented to build a optoelectronic receiver package, wherein the OE device comprises a photodiode array and the support/control circuitry comprises an photodiode amplifier IC chip (e.g., TIA (transimpedance amplifier)). In this embodiment, the photodiode array converts light signals received from the optical fibers (40) into electrical signals, which are then sent to an amplifier IC chip (mounted on the bottom of the optical bench 10) via turning vias (12) connected to output terminals of the photodiodes. In other embodiments, the optical bench (10) can be implemented to build an integrated transceiver package having both transmitter and receiver OE devices and supporting control/driver/amplifier circuitry.

In yet other exemplary embodiments of the invention, the optical fibers (40) can be replaced with other types of optical transmission lines, such as silicon waveguide structures. By way of example, waveguides can be integrally formed on the substrate of an optical bench by depositing suitable oxide and silicon layers on top of the substrate. In yet other exemplary embodiments of the invention, the optical fibers (40) can be replaced with other types of optical transmission lines, such as polymer waveguide structures. By way of example, waveguides can be integrally formed on the substrate of an optical bench by depositing suitable polymer cladding layers and polymer core material on top of the substrate. Various exemplary embodiments of optical benches according to the invention comprising waveguide structures will be described below with reference to the exemplary structures shown in FIGS. 7-8, for example.

Referring now to FIGS. 6A-6F, a method for building an optical bench according to an exemplary embodiment is shown. For illustrative purposes, the exemplary method of FIGS. 6A-6F will be described in relation to building an optical bench (10) such as depicted in FIGS. 2-5, for example. It is to be understood, however, that one of ordinary skill in the art can readily envision other optical bench structures/designs that can be formed using the exemplary method of FIGS. 6A-6F, depending on the intended application.

Referring initially to FIG. 6A, one or more vertical through vias (50) are formed in a conventional substrate (51) such as a silicon substrate, using methods well-known to those of ordinary skill in the art. These vertical through vias (50) are used to form the vertical portions (12a) of the turning vias (12) as described above. As noted above, turning vias can be formed for various purposes such as grounding, power and data signals. In addition, as noted above, to reduce the crosstalk between channels, additional grounding vias can be formed to electrically shield neighboring VCSELs.

In one exemplary embodiment, the substrate (51) has a thickness t of about 500 um. Although it is desirable to minimize the thickness of the substrate (51) to keep the OE device and supporting chips in close proximity and minimize the length of the turning vias, the thickness of the substrate will depend on factors such as, for example, the structural integrity of the substrate and the desired aspect ratio of the through-vias (50) that can be obtained using currently existing technology, as is understood by those of ordinary skill in the art.

Next, referring to FIG. 6B, cavities (53) are formed on the top and the bottom surface of the substrate (51) overlapping the ends of the via (50) exposed on the substrate surfaces using suitable masking and etching techniques known to those of ordinary skill in the art. As described above, the cavities (53) are used to form the 90 degree bending contacts for the turning vias (12). Essentially, the cavities are formed to laterally extend the via (50) in a direction transverse to the substrate surfaces. The surfaces of the via (50) and cavities (53) are then lined with an insulation layer using a suitable material such as silicon dioxide, silicon nitride, etc.

Next, the vias (50) and cavities (53) are filled with metal using known techniques to form electrical turning vias (54) having a vertical portion (54b) and upper and lower bending contacts (54a) and (54c), such as shown in FIG. 6C. For example, the via (50) and cavities (53) can be filled by metal plating to fill the cavities followed by chemical mechanical polishing (CMP) to remove any excess metal from the top and bottom surfaces of the substrate.

In another embodiment of the invention, vias (50) can be etched and filled with metal (by plating and CMP). Then, two thick metal lines can be formed on the top and bottom surfaces of the substrate (51) parallel to the substrate surface. One end of each thick metal line will connect to the via metal. The thick metal lines match the metal filled cavities layout. This process eliminates having to etch the cavities (53), at the price of having surface topography due to the thick metal lines.

Next, referring to FIG. 6D, insulator films (55a) and (55b) are respectively formed on the top and bottom surfaces of the substrate (51) using techniques known to those of ordinary skill in the art. The insulator films (55a) and (55b) may comprise a dielectric material such as an oxide or nitride.

Next, referring to FIG. 6E, one or more v-grooves (56) are etched in a portion of the top surface of the substrate (51) and the recessed surfaces of the v-groove channels are passivated. The v-grooves (56) can be formed by anisotropically wet etching the silicon substrate (51) using a suitable mask. More specifically, an initial anisotropic wet etching process can be performed using a hot KOH (Potassium Hydroxide) or a TMAH (tetramethyl ammonium hydroxide) and water solution. For example, starting with a single crystal silicon substrate having a [100] orientation, the mask edges for the grooves can be aligned with the {100} directions such that the anisotropic wet etching results in v-grooves bound by (111) planes which form inwardly sloping walls at 54.75° from the wafer surface. A silicon nitride layer can be used as a masking layer for KOH and water and a silicon dioxide or silicon nitride layer can be used as a masking layer for TMAH and water etching solutions. The width of the v-groove is determined by the size of the opening in the masking layer and any undercutting of the mask which occurs during the anisotropic etching, assuming that the mask is parallel or perpendicular to the {100} directions. The depth of the v-groove is determined by the width of the opening in the mask that defines the v-groove, since the etching self-terminates when the 111 planes are exposed. Knowing the geometric relationship between a v-groove channel and a fiber having diameter, the distance "z" at which the central axis of the fiber core will be above a substrate surface when the fiber is mounted in the v-groove channel can be determined based on the diameters of the fiber, the angle of the sloped sidewalls of the v-groove trench, and the width of the trench.

Furthermore, as noted above, x-axis alignment marks (e.g., marks 16 in FIG. 3) can be co-etched with the v-grooves for indicating a center of the fiber core.

In addition, a cavity (57) for hosting an OE device (e.g., the VCSEL bar 20) is etched in the substrate (51) by, e.g., forming a mask pattern over the substrate and RIE (Reactive Ion Etching) for etching to a desired depth below the surface of the substrate (or surface of top insulation layer (55a). The etching process results in a vertical sidewall (57a) and bottom surface (57a), wherein a side wall portion of the bending contact (54a) is exposed on the cavity sidewall (57b). Furthermore, the bottom insulation layer (55b) is patterned using suitable techniques to form opening (58) to the bending contacts (54c) so that the bottom contacts can be plated.

Figure 6F:
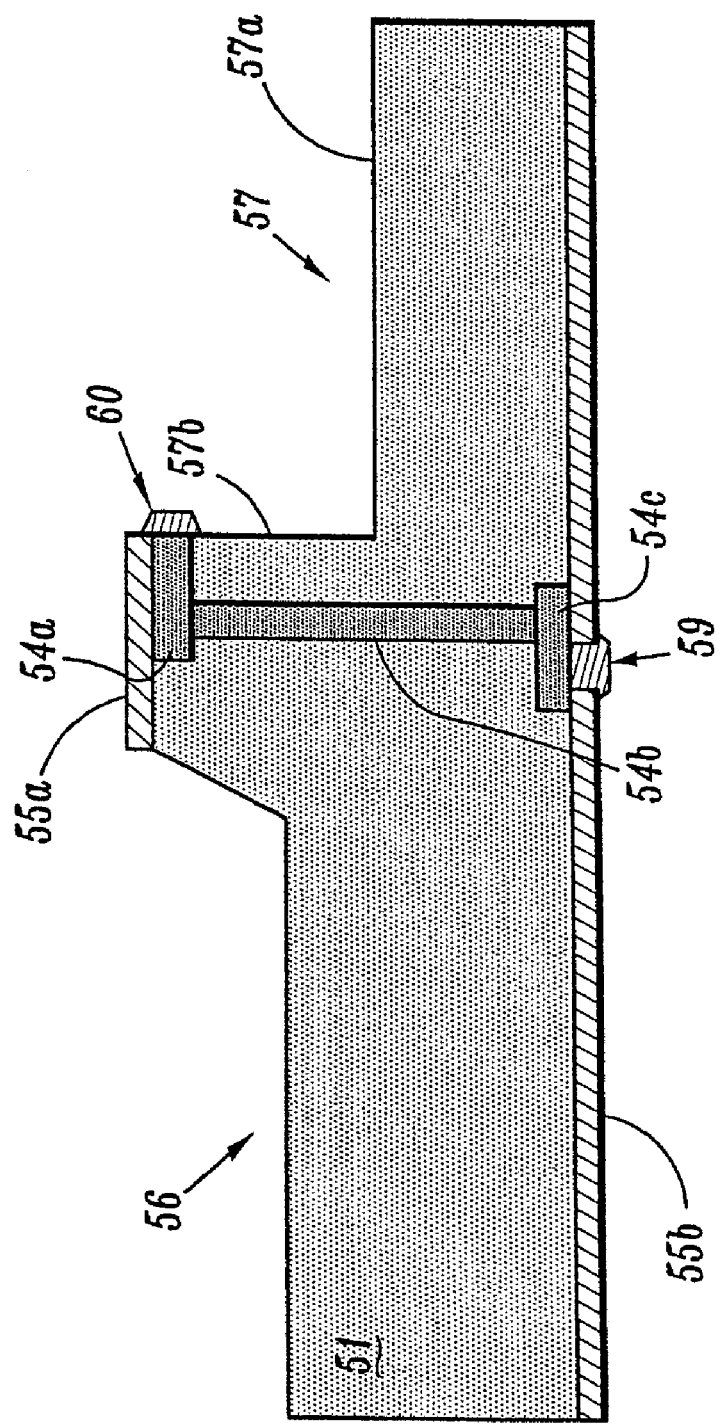

Referring now to FIG. 6F, solder is then plated over the exposed metal of the bending contacts (54a) and (54c) to form solder bumps (59) and (60), respectively. The exposed metal is used as a seed for the plated metal. This makes the plated solder to be self-aligned with the exposed portions of the metal.

Figure 7:
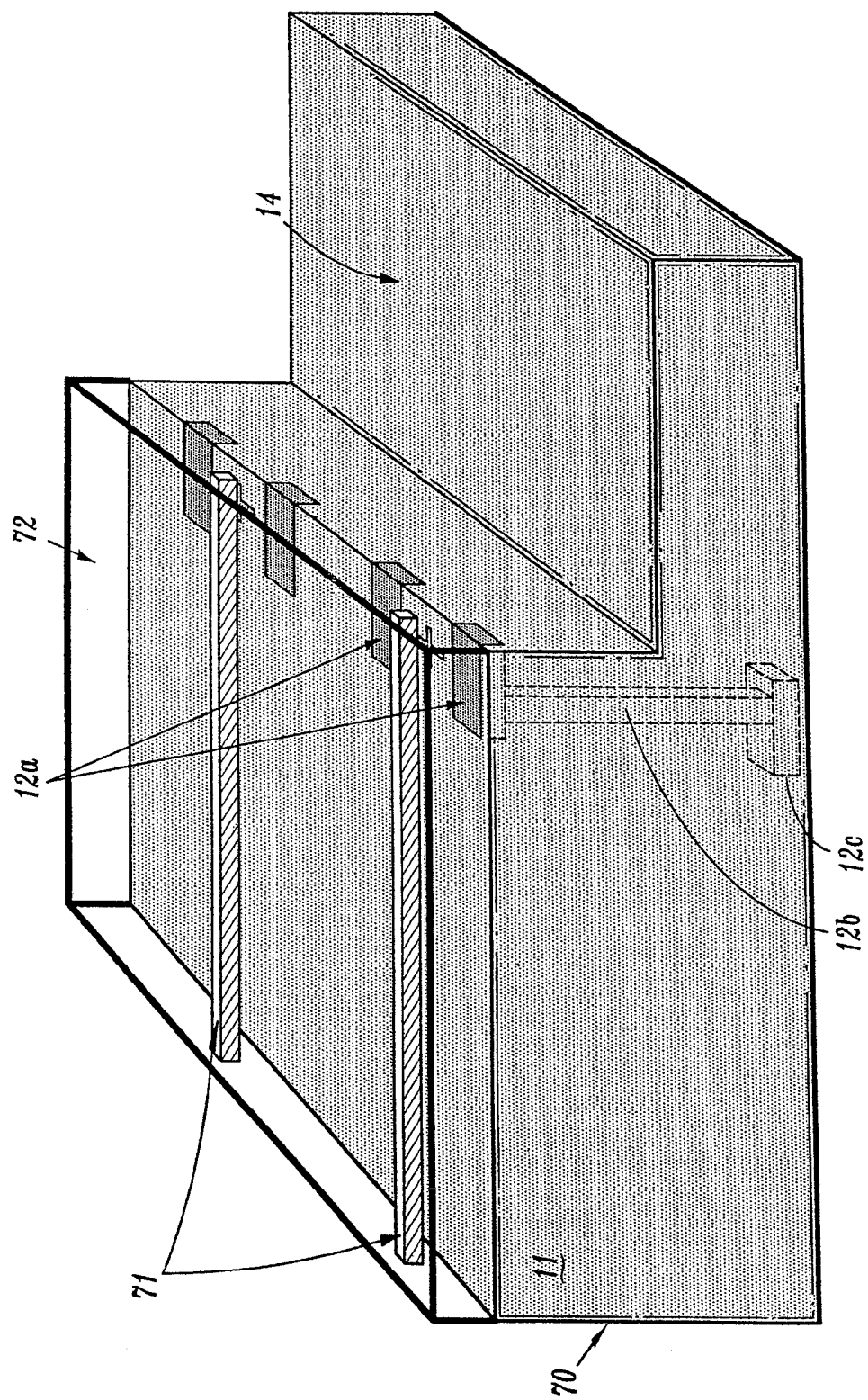
FIG. 7 is a three-dimensional perspective view schematically illustrating an optical bench according to another exemplary embodiment of the invention.

Referring now to FIG. 7, a three-dimensional perspective view schematically illustrates an optical bench according to another exemplary embodiment of the invention. The exemplary optical bench (70) depicted in FIG. 7 is similar to the exemplary optical bench (10) depicted in FIG. 3, for example, except that the exemplary optical bench (70) comprises a waveguide structure formed thereon, rather than a v-groove channel array for mounting optical fibers. In particular, the optical bench (70) comprises one or more waveguide cores (71) surrounded by waveguide cladding (72). As depicted in FIG. 7, the use of the waveguide structure on the optical bench (70) allows the ends of the waveguide cores (71) to be essentially butted against the OE devices (e.g., VCSELs).

Various techniques well-known to those of ordinary skill in the art may be employed for integrally forming waveguide structures on the optical bench (70) according to the invention. For example, waveguides can be formed by depositing and processing thin films, applying lamination layers, etc. More specifically, by way of example, the waveguide structure depicted in FIG. 7 can be formed, in general, by depositing a layer of oxide (cladding) on the surface of the substrate (11), followed by depositing and patterning of layer of core material (e.g., silicon, nitride, etc.) to form the cores (71), and then depositing another layer of oxide to cover the cores (71) and encapsulate the cores (71) to form the cladding (72). As is known in the art, the type of core material that can be used will varying depending on the wavelength of light. Further, the core material must have a higher index of refraction than the cladding material.

Further, in other exemplary embodiments, the cores (71) can be formed by first depositing a layer of oxide, then patterning a mask on the oxide defining the cores, and using the mask to perform ion implantation to implant ions (e.g., germanium) into the oxide at a certain depth to thereby form the waveguide cores within the oxide layer, followed by depositing another layer of oxide to cover the first oxide layer having the ion implanted waveguide cores.

Figure 8:
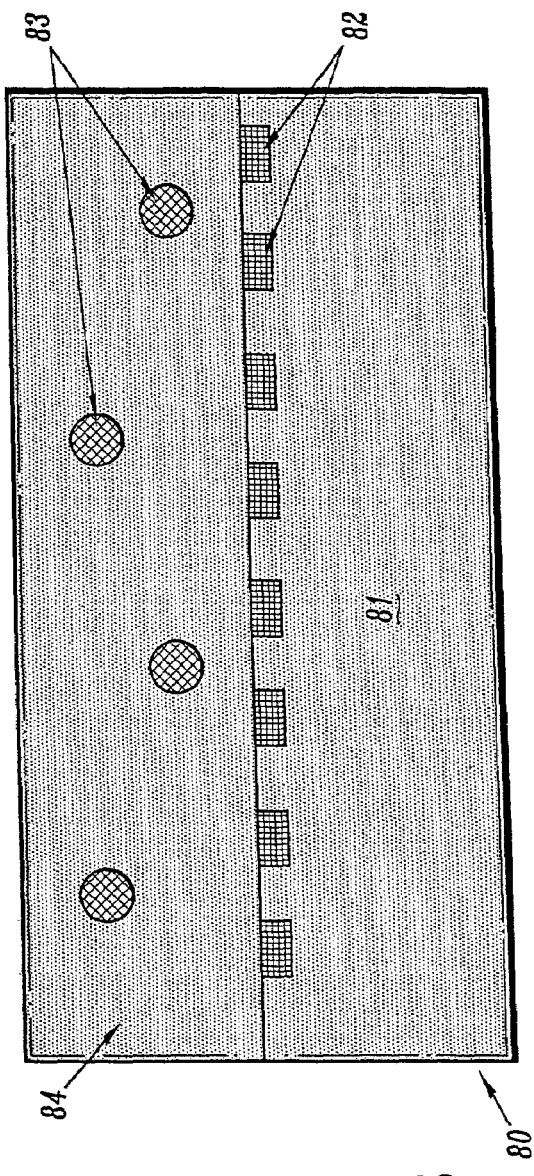
FIG. 8 is a side view schematically illustrating an optical bench according to another exemplary embodiment of the invention.

FIG. 8 is a schematic diagram illustrating an optical bench structure according to another exemplary embodiment of the present invention. In particular, FIG. 8 is a side view of a portion of an optical bench (80) depicting a vertical sidewall (81) of a recessed cavity having exposed portions of upper bending contacts (82) of turning vias, and a waveguide structure comprising a plurality of waveguide cores (83) formed at alternating depths within waveguide cladding (84). The exemplary embodiment of FIG. 8 depicts a waveguide structure that is formed by two layer of waveguides, as is understood by those of ordinary skill in the art. The alternating core depth enables a more dense and compact array. It is to be understood that a similar optical bench structure as depicted in FIG. 8 can be obtained using optical fibers by alternating the depth of v-grooves, such as making alternating deep and shallow v-groove channels.

Figure 9:
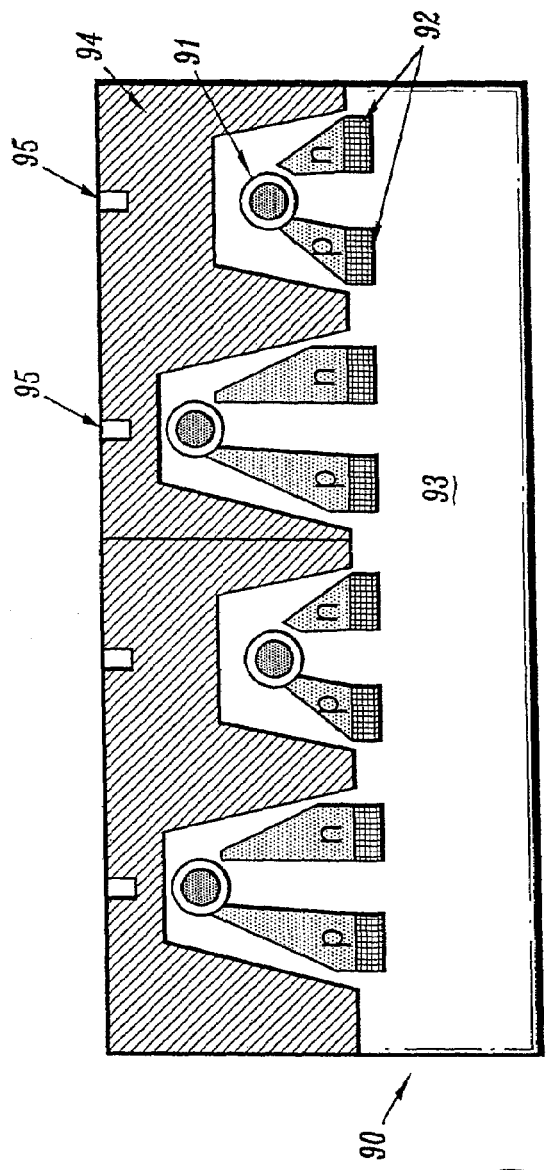
FIG. 9 schematically illustrates a top view of a optoelectronic device having an alignment structure that enables passive alignment of the optoelectronic device to the exemplary optical bench device of FIG. 8, according to another exemplary embodiment of the present invention.

FIG. 9 schematically illustrates a top view of a optoelectronic device having an alignment structure that enables passive alignment of the optoelectronic device to an optical bench device, according to another exemplary embodiment of the present invention. More specifically, FIG. 9 depicts a top surface view a VCSEL bar (90) that can be used to interface to the exemplary optical bench (80) of FIG. 8. A light-emitting surface (93) of the VCSEL bar (90) comprises a plurality of VCSELs (91) each having P/N contact pads (92) which contact the exposed contacts (82) shown in FIG. 8. The VCSEL layout of the VCSEL array enables a more dense array, as is understood by those of ordinary skill in the art. Further, the light-emitting surface (93) comprises a push-stop thin film (94), which enables z-alignment of the VCSELs to the waveguide cores (83), as well as alignment marks (95) to the centers of the VCSELs (91) which enables x-alignment, in the same manner as discussed above.

Although illustrative embodiments have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for fabricating an optical bench, comprising the steps of:
providing a substrate having a first surface and a second surface, the first and second surfaces defining planes that are substantially parallel;
etching a via hole through the substrate between the first and second surfaces;
etching a first cavity in the first surface, wherein the first cavity overlaps a first end portion of the via hole exposed on the first surface;
etching a second cavity in the second surface, wherein the second cavity overlaps a second end portion of the via hole exposed on the second surface; and
filling the via hole, first cavity, and the second cavity with a conductor to form a conductive via.

2. The method of claim 1, further comprising etching a cavity in the substrate below the first surface to expose a portion of the conductor in the first cavity on a sidewall of the cavity, the sidewall of the cavity being substantially perpendicular to the first and second surfaces.

3. The method of claim 2, further comprising forming a solder bump on the exposed portion of the conductor of the first cavity.

4. The method of claim 1, further comprising:
forming an insulating layer on the first and second surfaces of the substrate;
forming an opening the insulating layer on the second surface to expose a second end portion of the conductive via on the second surface of the substrate; and
forming solder bump on the exposed second end portion of the conductive via.

5. The method of claim 1, further comprising:
etching a v-groove in the first surface of the substrate for hosting an optical fiber; and
etching an alignment mark in the first surface of the substrate to correspond to the etched v-groove.

6. A method for fabricating an optical bench, comprising the steps of:
  providing a substrate having a first surface and a second surface, the first and second surfaces defining planes that are substantially parallel;
  etching a via hole through the substrate between the first and second surfaces;
  etching a first cavity in the first surface, wherein the first cavity overlaps a first end portion of the via hole exposed on the first surface;
  filling the via hole and first cavity with a conductor to form a conductive via; and
  etching a second cavity in the substrate below the first surface to expose a portion of the conductor in the first cavity on a sidewall of the second cavity, the sidewall of the second cavity being substantially perpendicular to the first and second surfaces.

7. The method of claim 6, further comprising forming a solder bump on the exposed portion of the conductor of the first cavity.

8. The method of claim 6, further comprising:
  forming an insulating layer on the first and second surfaces of the substrate;
  forming an opening the insulating layer on the second surface to expose a second end portion of the conductive via on the second surface of the substrate; and
  forming a solder bump on the exposed second end portion of the conductive via.

9. The method of claim 6, further comprising:
  etching a v-groove in the first surface of the substrate for hosting an optical fiber; and
  etching an alignment mark in the first surface of the substrate to correspond to the etched v-groove.

* * * * *